C. F. SCHNEIDER.
CATTLE POKE.
APPLICATION FILED JAN. 7, 1921.
1,423,362.
Patented July 18, 1922.
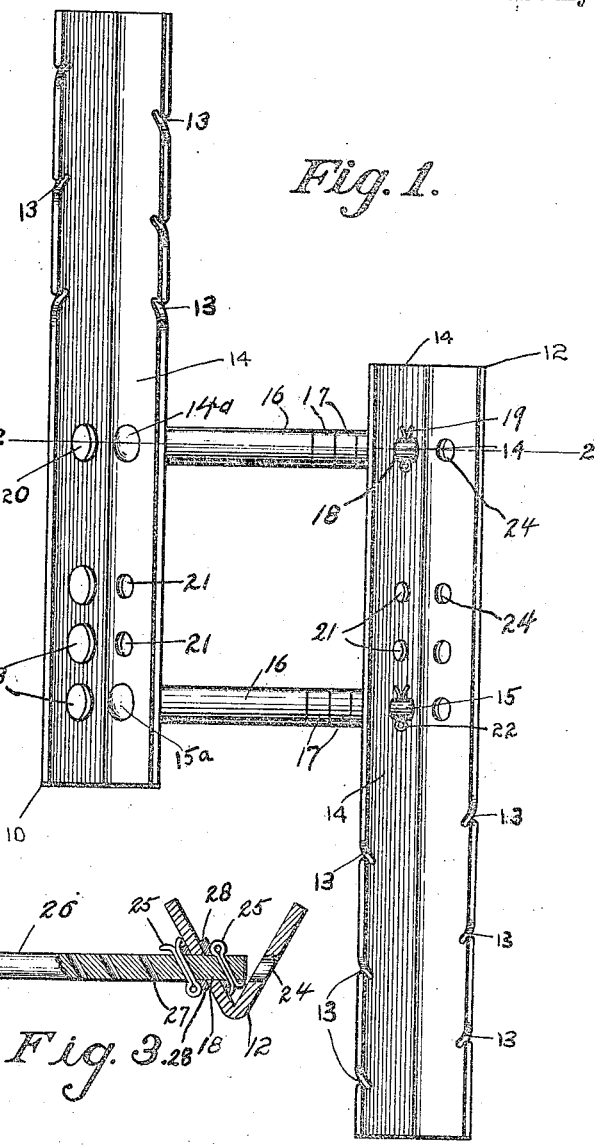
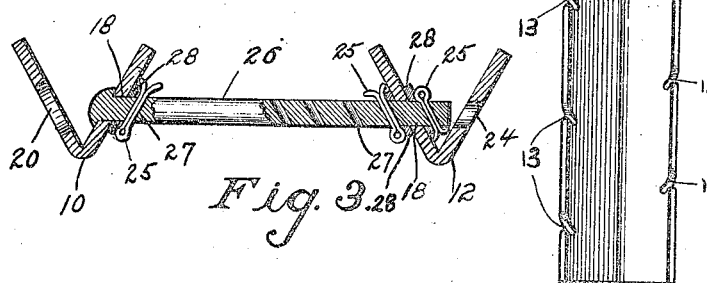
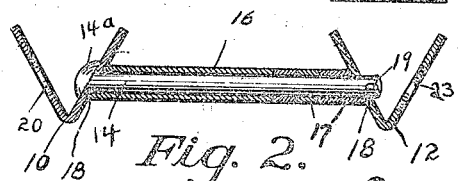
Inventor
CHARLIE F. SCHNEIDER

UNITED STATES PATENT OFFICE.

CHARLIE F. SCHNEIDER, OF ENID, OKLAHOMA.

CATTLE POKE.

1,423,362.  Specification of Letters Patent.  Patented July 18, 1922.

Application filed January 7, 1921. Serial No. 435,641.

*To all whom it may concern:*

Be it known that I, CHARLIE F. SCHNEIDER, a citizen of the United States, residing at Enid, in the county of Garfield and State of Oklahoma, have invented certain new and useful Improvements in a Cattle Poke; and I do hereby declare the following to be a full, clear, and exact description of the invention, such as will enable others skilled in the art to which it appertains to make and use the same.

This invention relates to cattle pokes, and one of the objects is to provide a device of this kind which shall be simple of construction, which may be readily and quickly adjusted to adapt it for application to animals of various sizes, and which may be readily and quickly applied to and removed from an animal.

Another object is to provide a device which when applied, shall be comfortably worn about the neck of the animal without causing injury, and with the bars extending, one in an upwardly, and the other in a downwardly direction from the neck, thus being in position to readily engage the bars of the poke with the wires of a fence or other enclosure through which the animal may attempt to make escape.

With the foregoing and other objects in view, the invention consists in the novel construction, combination, and arrangement of elements, hereinafter described and claimed, it being understood that variations and modifications in construction may be made within the scope of the appended claims.

For a complete understanding of my invention, reference will be made to the following description and accompanying drawing, in which:

Figure 1 is a view in front elevation of a cattle poke constructed in accordance with my invention, Figure 2 is a sectional view taken in the plane indicated by the line 2—2 of Figure 1, looking in the direction indicated by the arrows, and Figure 3 is a view similar to Figure 2 illustrating a slightly modified form of the means for securing the bars in spaced relation upon the bolts.

Similar reference numerals refer to like parts throughout the different views of the drawing.

In carrying out my invention, I provide bars 10 and 12 which are preferably V-shaped in cross section and which are so arranged that their inner sides are disposed forwardly when the poke is in applied position. One of the bars is adapted to extend above and the other below the neck of the animal when the device is in applied position, and the forward edges of the upper portion of the bar 10 and the lower portion of the bar 12 are provided with notches 13 adapted, when the animal makes an attempt to pass through a fence, to engage the line wires of the fence and prevent such passage.

The bars are connected together for adjustment laterally with respect to each other by means which is also adjustable, and in view of these adjustments, the poke is adapted for application to animals of various sizes. This means comprises an upper bolt 14 and a lower bolt 15 and a long sleeve 16 and a plurality of short sleeves 17 positioned upon each of the bolts between the bars 10 and 12. The upper bolt 14 passes through a pair of openings 18 in the inner flanges of the bars 10 and 12 and it is secured in position by its head $14^a$ and a cotter pin 19. To permit the application and removal of this bolt, the outer flange of the bar 10 is provided with an opening 20. The lower bolt 15 passes through one pair of a series of alined openings 21 formed in and extending longitudinally of the inner flanges of the bars 10 and 12, and it is secured in place by its head $15^a$ and a cotter pin 22. To permit the application and removal of the lower bolt 15, the outer flange of the bar 10 is provided with a series of openings 23 which are alined with the openings 21. The bars are held in relatively spaced relation upon the bolts 14 and 15 by the sleeves 16 and 17 and these sleeves and the heads of the bolts and the cotter pins or keys 19 and 22 prevent the bars from having any movement with respect to each other.

The bars may be adjusted with respect to each other, and the bolt 15 adjusted with respect to the bolt 14 to adapt the device for application to animals of various sizes, and this may be done by removing one or more of the short sleeves 17 or by adding one or more of such sleeves and by moving the bolt 15 from one pair of the openings 21 into another pair of said openings. When the poke is in applied position one bar engages one side of the animal's neck and the other bar engages the opposite side, and in view thereof the device is held against any rotative movement upon the animal's neck. To receive the bolts 14 and 15 when the bar 12 is adjusted in the direction of the bar 10 the outer flange of the bar 12 is provided with openings 24.

By reference to Figure 3, it will be seen that in lieu of the sleeves 16 and 17 cotter pins 25 may be employed to secure the bars 10 and 12 in spaced relation upon the bolts, only one bolt designated 25 being shown in this figure. These bolts are provided with bores 27 to receive the cotter pins 25 and such bores are inclined with respect to the axes of the bolts for a purpose that is obvious. Washers 28 are mounted upon the bolts 26 between the cotter pins 25 and the inner flanges of the bars 10 and 12.

Having thus fully described my invention, what I claim is:—

1. A cattle poke having bars, said bars having spaced and connected walls, connecting means extending through the innermost of said walls, and the outermost wall of one of said bars having openings therethrough, and said means being passable through said opening for insertion or removal.

2. A cattle poke having bars, said bars having walls connected at one edge and spaced apart at the other edge, the longitudinal edge of said walls having notches to engage fence wires, a fastening means secured to the innermost walls of said bars, and the outermost walls of said bars having openings to facilitate application and removal and adjustment of said fastening means.

In testimony whereof I affix my signature in presence of two witnesses.

CHARLIE F. SCHNEIDER.

Witnesses:
   Geo. D. Wilson,
   Thos. Braden.